United States Patent [19]
Peregrine

[11] Patent Number: 5,697,128
[45] Date of Patent: Dec. 16, 1997

[54] LOOP FASTENING DEVICE HAVING AN ELASTICIZED CORD AND A SLIDEABLE LOCK ELEMENT

[75] Inventor: Paul Kent Peregrine, Highlands Ranch, Colo.

[73] Assignee: Lightware, Inc., Denver, Colo.

[21] Appl. No.: 133,692

[22] Filed: Oct. 7, 1993

[51] Int. Cl.⁶ .................................................. F16G 11/14
[52] U.S. Cl. ........................ 24/115 G; 24/115 H; 24/482
[58] Field of Search ........................ 24/115 H, 115 G, 24/114.5, 16 PB, 16 R, 482, 115 K

[56] References Cited

U.S. PATENT DOCUMENTS

| | | |
|---|---|---|
| 3,776,565 | 12/1973 | Granville ........................ 24/115 H X |
| 4,328,605 | 5/1982 | Hutchison et al. . |
| 4,364,538 | 12/1982 | Tomlinson ........................ 24/115 H X |
| 4,393,550 | 7/1983 | Yang et al. . |
| 4,453,292 | 6/1984 | Bakker . |
| 4,622,723 | 11/1986 | Krauss . |
| 4,675,948 | 6/1987 | Bengtsson . |
| 4,789,070 | 12/1988 | Bennett . |
| 4,885,824 | 12/1989 | Schwab et al. ........................ 24/115 H X |
| 5,131,290 | 7/1992 | Atkinson . |
| 5,282,825 | 2/1994 | Muck et al. ........................ 24/115 H X |

FOREIGN PATENT DOCUMENTS

| | | |
|---|---|---|
| 1276059 | 10/1960 | France . |
| 70432 | 4/1928 | Sweden . |

*Primary Examiner*—James R. Brittain
*Attorney, Agent, or Firm*—F. A. Sirr; E. C. Hancock; Holland & Hart llp

[57] ABSTRACT

The two ends of an elongated, flexible, elasticized cord are side by side aligned and then passed through a manually opened barrel-shaped fastener having a spring biased plunger. The spring biased plunger is then released. This operating forms a loop from the elasticized cord. The two aligned ends of the cord are then bound together to form an enlarged end portion that will not pass back through the barrel fastener even when the fastener has been manually opened.

1 Claim, 1 Drawing Sheet

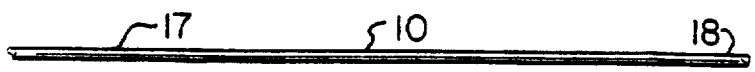
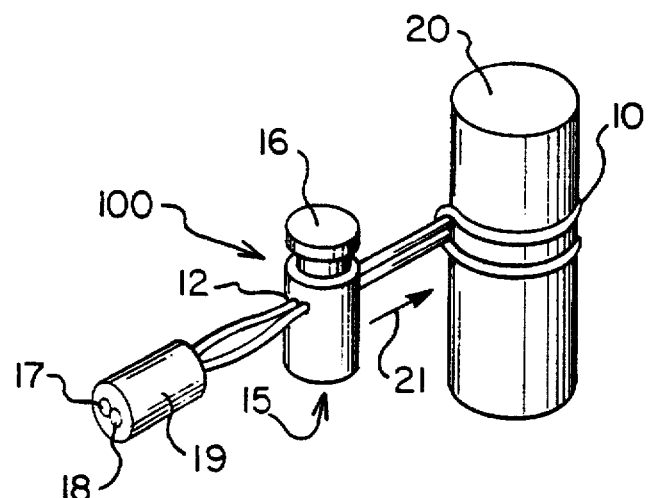
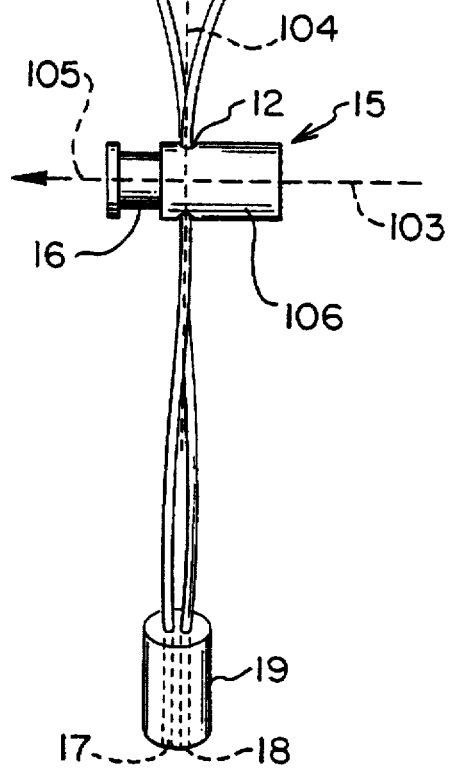
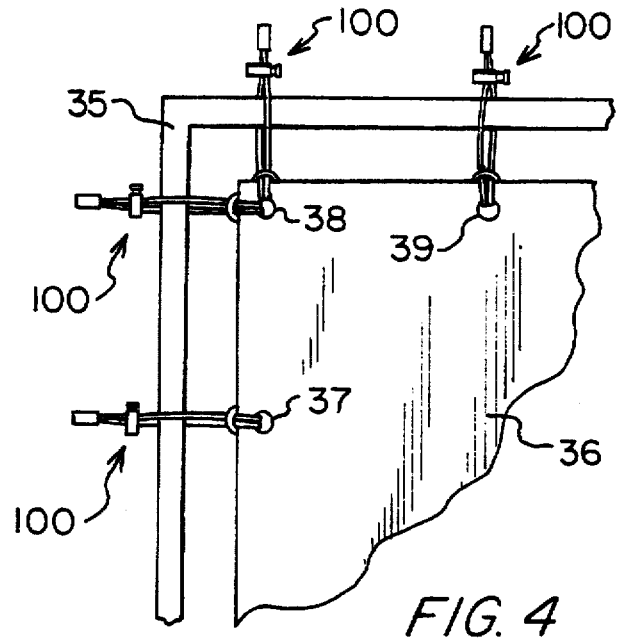

LOOP FASTENING DEVICE HAVING AN ELASTICIZED CORD AND A SLIDEABLE LOCK ELEMENT

BACKGROUND OF THE INVENTION

1. Field of the Invention

This invention pertains to the field of multiple use loop fastening devices having an elasticized cord and a slideable locking element to facilitate the holding and securing of various size structural members.

2. Description of the Prior Art

It is well known to use an elasticized cord as a fastening device. It is also well know to use line locks of various configurations.

U.S. Pat. Nos. 4,328,605, 4,453,292, 4,622,723 and 4,675,948 disclose line locks of the type that are generally useful in the practice of the present invention.

Swedish Patent 70,432 shows a form of a string, wire or thread lock.

French Patent 1.276.059 shows an adjustable loop whose length is controlled by a type of line lock.

U.S. Pat. No. 4,393,550 discloses a safety clasp for footwear wherein a double line lock holds the shoe laces.

U.S. Pat. No. 4,789,070 discloses a clothes airer having a pair of hinged frames whose relative spacing is adjusted by the position of a line lock on a line.

U.S. Pat. No. 5,131,290 discloses a removable steering wheel cover wherein an elastic cord is sewen into the cover, the length of the cord that is trapped within the cover being adjusted by the use of a barrel lock.

While the above devices are generally useful for their limited intended purposes, there is a need in the art for an improved loop fastening device having a loop that is free of other objects and is thus of general utility in surrounding virtually any object that is to be held, wherein manufacturing assembly of the device is simplified, wherein the manual force that is required to move the line lock as the loop size is adjusted is minimized and is not dependent upon a desired loop holding force, and wherein the holding force that is provided by the line lock does not change with cord wear and the like.

SUMMARY OF THE INVENTION

This invention provides a multiple use loop fastening device having a flexible elasticized cord and a manually releasable and slideable locking element that facilitates the holding and securing of various size structural members. The device of the invention provides a simplified manufacturing process, or method, provides a device wherein the manual force that is required to move the locking element along the cord to adjust loop size is minimized by virtue of the fact that the holding force of the locking element is manually releasable during such movement, and wherein the cord holding force of the locking element does not change appreciably with use of the device.

The device of the invention comprises an elongated, flexible, elasticized cord that is formed into a loop, and a manually releasable friction clamp that encircles two parallel runs of the cord and is slideable among the parallel cord runs as the size of the loop is selectively adjusted. As a feature of the invention, the two aligned ends of the cord can be permanently clamped together, such as by the use of a metal crimping device. As a further feature of the invention, the manually releasable friction clamp comprises a manually open barrel-shaped fastener having a spring biased plunger, the plunger operating to allow free movement of the cord runs when the plunger is depressed, and operating to frictionally trap the parallel cord runs within an opening that is formed in the barrel shaped fastener.

In manufacture of the device, the two ends of the cord are first placed in a parallel, side by side, and end-aligned relationship. The two cord ends are then passed through the barrel shaped fastener as the fastener is manually held in its open position. The fastener's spring biased plunger is then released. This operating forms the elasticized cord into a loop having two adjacent parallel runs that pass through the fastener. The two parallel and aligned ends of the cord are then bound together, as by the use of a metal tubular shaped cinch, to form an enlarged end portion that will not pass back through the barrel fastener even when the fastener has been manually opened.

An object of the present invention is to provide a fastening device comprising an elongated and flexible elasticized cord having two ends, the cord being formed into a loop wherein the cord ends are generally end-aligned and extend generally parallel to each other. A manually releasable and slideable locking element has an opening therein that encircles the cord ends, the opening being somewhat larger than the cross-sectional area of the cord ends, the locking element having a manually releasable member that is force biased to frictionally trap the cord ends in the opening, and the locking element being manually releasable to enable the locking element to freely slide along the cord loop as the loop size is adjusted. As a feature of the invention, a nonreleasable cord-binding clamp encircles the cord ends and operates to enlarge the cross-sectional area of the two cord ends so that the cord ends are larger than the size of the opening in the locking element.

A further object of the invention is to provide a method for manufacturing the above-mentioned fastening device comprising the steps of providing an elongated and flexible elasticized cord having two ends, forming the cord into a loop wherein the ends are generally end-aligned and extend generally parallel to each other, and providing a manually releasable and slideable locking element having an opening therein that encircles the cord ends, the opening being somewhat larger than the cross sectional area of the cord ends, the locking element having a manually releasable member that is force biased to frictionally trap the cord ends in the opening, and the locking element being manually releasable to enable the locking element to freely slide along the cord loop to adjust the loop size.

These and other objects and advantages of the invention will be apparent to those of skill in the art upon reference to the following detailed description, which description makes reference to the drawing.

BRIEF DESCRIPTION OF THE DRAWING

FIG. 1 is a plan view of a loop fastening device in accordance with the invention.

FIG. 2 is a plan view of the elongated, flexible, elastic cord shown in FIG. 1.

FIG. 3 shows the loop fastening device of FIG. 1 in use to form a loop about an object.

FIG. 4 shows the loop fastening device of FIG. 1 in use to hold a flexible sheet or sign to a metal frame.

DESCRIPTION OF THE PREFERRED EMBODIMENT

FIG. 1 is a plan view of a loop-fastening device 100 in accordance with the present invention. This device as shown in FIG. 2 comprises an elongated, flexible, elasticized cord 10 having two ends 17 and 18. Without limitation thereto, cord 10 is generally circular in cross section. The ends 17,18 of cord 10 are looped and then passed through a generally circular, or elliptical, opening or bore 12 that is formed in the generally cylindrical housing 106 of a locking device 15. Housing 106 has a central axis that is generally identified by broken line 103. The central axis 104 of opening 12 extends generally normal to axis 103. A cylindrical spring biased plunger 16 is spring biased in the direction of axis 103 (by operation of a spring that is internal to the housing 106 of locking device 15), as is shown by arrow 105. Plunger 16 contains an opening, or bore, that mates, or is aligned with, opening 12 when plunger 16 is manually moved to the right, against the above-mentioned spring force, to thus align the opening in plunger 16 with the opening 12 in locking device 15. When these two openings are thus aligned, locking device 15 can be manually moved along the two runs of cord 10 to thus adjust the size of the loop that is formed thereby. This movement requires a minimum of force because the cross-sectional area of the two aligned openings is somewhat larger than the two cord runs that pass therethrough. Once the desired size loop is formed about an object, and cord 10 is stretched a desired amount, plunger 16 is released. The holding force of locking device 15 is dependent only upon the above-mentioned spring bias of plunger 16, and yet the force required to adjust the loop size is minimized greatly because manual movement of plunger 16 to the right, as shown in FIG. 1, operates to align the two above-mentioned openings, and thus allow locking device 15 to freely move along the two runs of the cord loop.

Without limitation thereto, locking device 15 may comprise a well-known barrel-shaped locking device of the Fastex brand by ITW Nexus.

As a feature of the invention, cord ends 17,18 are clamped together by operation of a crimping device 19. In practice, crimping device 19 comprises a metal tube that is crimped down onto cord ends 17,18 to nonreleasably secure the cord ends. In this embodiment of the invention, crimping device resembles a well-known wire clamp.

During manufacture of the device shown in FIG. 1, cord 10 first is formed into a loop wherein cord ends 17,18 are placed in parallel and generally abutting relation, and with cord ends 17,18 generally end-aligned. Plunger 16 is then depressed to align the opening in the plunger with opening 12 in housing 106. The two aligned cord ends 17,18 are now easily passed through these two aligned openings. Plunger 16 is then released. Crimping device 19 is then mounted onto cord ends 17,18. Crimping device 19 operates to increase the cross-sectional area of cord ends 17,18 such that the cord ends cannot freely pass back through aligned openings in locking device 15, thus preventing accidental escape of cord ends 17,18. Crimping device 19 also binds the two cord ends together, and thus provides a means whereby the device may be hung, or stored, on a wall or the like. Within the spirit and scope of the invention, the cross-sectional area of cord ends 101,102 may be increased by other means, such as forming a knot in the cord ends.

Without limitation thereto, embodiments of the invention comprise a cord 10 of generally ⅛ inch diameter. The length of cord 10 is variable and may, for example, comprise 12, 16, 20 and 24 inches.

FIG. 3 shows one loop fastening device 100 of FIG. 1 in use to form a two-run cord loop about an object 20. Object 20 may, for example, comprise a bundle of wires or cables. Arrow 21 of FIG. 3 shows how fastening device 15 is moved to the right to be positioned adjacent to the side of object 20, thus stretching cord 10 and securing the cord to object 20. FIG. 4 shows a plurality of the loop fastening devices 100 of FIG. 1 in use to hold a sheet 36 having eyelets 37,39 therein to a metal frame 35. In both, the use embodiments of FIG. 3 and 4 two-run cord loops have been formed by passing cord ends 17,18 and locking device 15 back through the cord loop. Another use of the invention is to form a one-cord loop by slipping the loop shown in FIG. 1 over an object or objects to be secured.

An important method of using the present invention is shown in FIGS. 3 and 4. In both of these figures, an object, such as 20, is encircled with the free standing loop 50 that is shown in FIG. 1. Free-standing loop 50 is the position adjacent to locking element 15. Locking element 15 is then passed through loop 50. Locking element 15 is now manually released, as by pressing on plunger 16. Locking element 15 is now moved along the two cord runs comprising loop 50 in a manner to stretch loop 50 about object 20. Locking element 15 is now released by releasing plunger 16. In this manner, objects such as 20 and 36, are securely held, and there is no need to slip loop 50 over the object to be held.

While the invention has been described with reference to preferred embodiments thereof, it is recognized that those skilled in the art will readily visualize yet other embodiments that are within the spirit and scope of the invention. Thus, the above-detailed description is not to be taken as a limitation on the invention.

What is claimed is:

1. A method of fastening at least two objects closely together, including the sequential steps of:

providing an elongated and flexible elasticized cord having two ends;

forming said cord into a free-standing loop having two cord runs wherein said two cord ends are generally end-aligned and extend parallel to each other;

providing a manually releasable and slidable barrel-shaped fastener having an opening therein that encircles said two cord runs that comprise said free-standing loop;

providing said opening somewhat larger than a cross sectional area of said two cord runs;

providing said barrel-shaped fastener with a manually releasable plunger that is spring biased to reduce said opening to a size generally smaller than said cross sectional area of said two cord runs to thereby frictionally trap said two cord runs in said opening;

said plunger being manually releasable to enable said barrel-shaped fastener to freely slide along said two cord runs;

providing a tubular clamping member encircling and crimped to said two cord ends;

said tubular clamping member operating to enlarge a cross sectional area of said two cord ends so that said cross sectional area of said two cord ends is larger than said size of said opening in said barrel-shaped fastener;

encircling at least two objects with said free-standing loop;

positioning said free-standing loop adjacent to said tubular clamping member;

passing said tubular clamping member and said barrel-shaped fastener through said free-standing loop;

releasing said barrel-shaped fastener from said two cord runs by operation of said plunger;

moving said barrel-shaped fastener to a position along said two cord runs in a manner to stretch said free-standing loop about said at least two objects; and allowing said barrel-shaped fastener to frictionally trap said cord runs with said barrel-shaped fastener in said moved position.

* * * * *